US012803926B2

(12) United States Patent
Lee

(10) Patent No.: US 12,803,926 B2
(45) Date of Patent: *Nov. 17, 2026

(54) PROVISIONING AND MANAGING RESOURCES

(71) Applicant: Comcast Cable Communications, LLC, Philadelphia, PA (US)

(72) Inventor: Yiu Leung Lee, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 174 days.

This patent is subject to a terminal disclaimer.

(21) Appl. No.: 18/776,849

(22) Filed: Jul. 18, 2024

(65) Prior Publication Data

US 2024/0372818 A1 Nov. 7, 2024

Related U.S. Application Data

(63) Continuation of application No. 14/610,604, filed on Jan. 30, 2015, now Pat. No. 12,081,453.

(51) Int. Cl.
*H04L 47/762* (2022.01)
*H04L 47/70* (2022.01)

(52) U.S. Cl.
CPC .......... *H04L 47/762* (2013.01); *H04L 47/822* (2013.01)

(58) Field of Classification Search
CPC ................................ H04L 47/62; H04L 47/70
See application file for complete search history.

(56) References Cited

U.S. PATENT DOCUMENTS

| | | | |
|---|---|---|---|
| 5,742,772 | A | 4/1998 | Sreenan |
| 6,185,566 | B1 | 2/2001 | Adams et al. |
| 6,654,750 | B1 | 11/2003 | Adams et al. |
| 7,215,678 | B1 | 5/2007 | Ahlfors et al. |

(Continued)

FOREIGN PATENT DOCUMENTS

| | | | |
|---|---|---|---|
| CN | 1601979 | A | 3/2005 |
| EP | 1 850 532 | A1 | 10/2007 |

(Continued)

OTHER PUBLICATIONS

Bohge, Mathias, et al., An Authentication Framework for Hierarchical Ad Hoc Sensor Networks, (2003) ACM 1-58113-769-9/03/0009 (9 pages).

(Continued)

*Primary Examiner* — Jason D Recek
(74) *Attorney, Agent, or Firm* — Ballard Spahr LLP

(57) ABSTRACT

Systems and methods for provisioning and managing resources are disclosed. Methods can comprise determining whether a first condition is met based upon a first characteristic relating to one or more of a user device and a first network device. Association between the user device and the first network device can be granted if the first condition is met; association can be denied otherwise. Service can be provided to the user device via the first network device if the first network device is configured to meet a second condition. The second condition can be based upon a second characteristic relating to one or more of the user device and the first network device. The user device can be caused to associate with a second network device if the first network device is not configured to meet the second condition.

30 Claims, 8 Drawing Sheets

(56) References Cited

U.S. PATENT DOCUMENTS

| | | | |
|---|---|---|---|
| 7,380,264 | B2 | 5/2008 | Potrebic |
| 7,409,140 | B2 | 8/2008 | Rodriguez et al. |
| 7,512,315 | B2 | 3/2009 | Kaminski et al. |
| 7,529,203 | B2 | 5/2009 | Bajic et al. |
| 7,620,007 | B2 | 11/2009 | Rodin et al. |
| 7,765,235 | B2 | 7/2010 | Day et al. |
| 8,135,412 | B2 | 3/2012 | Theobold et al. |
| 8,306,027 | B2 | 11/2012 | Meier et al. |
| 8,356,075 | B2 | 1/2013 | Balko |
| 8,356,110 | B2 | 1/2013 | Udani et al. |
| 8,363,628 | B2 | 1/2013 | Chi et al. |
| 8,405,770 | B2 | 3/2013 | White et al. |
| 8,452,286 | B2 | 5/2013 | Binding et al. |
| 8,533,281 | B2 | 9/2013 | Bodin et al. |
| 8,750,239 | B1 | 6/2014 | Martini |
| 9,032,060 | B2 | 5/2015 | Blaisdell |
| 10,142,259 | B2 | 11/2018 | Phillips et al. |
| 2002/0133589 | A1 | 9/2002 | Gubbi et al. |
| 2003/0133049 | A1 | 7/2003 | Cowley et al. |
| 2006/0068799 | A1 | 3/2006 | Morton et al. |
| 2006/0129627 | A1 | 6/2006 | Phillips et al. |
| 2007/0171823 | A1 | 7/2007 | Hunt et al. |
| 2007/0174336 | A1 | 7/2007 | Day et al. |
| 2007/0189243 | A1 | 8/2007 | Wang et al. |
| 2007/0277207 | A1 | 11/2007 | Yun et al. |
| 2008/0155618 | A1 | 6/2008 | Grady et al. |
| 2009/0083366 | A1 | 3/2009 | Roantree et al. |
| 2009/0222875 | A1 | 9/2009 | Cheng et al. |
| 2009/0268631 | A1 | 10/2009 | Li et al. |
| 2010/0188575 | A1 | 7/2010 | Salomons et al. |
| 2010/0333208 | A1 | 12/2010 | Day et al. |
| 2011/0188374 | A1 | 8/2011 | Zhou et al. |
| 2011/0296482 | A1* | 12/2011 | Melsen .............. H04N 21/2396 725/109 |
| 2012/0054312 | A1 | 3/2012 | Salinger |
| 2012/0066366 | A1 | 3/2012 | Blaisdell |
| 2012/0243473 | A1 | 9/2012 | Kadous et al. |
| 2012/0287783 | A1 | 11/2012 | Kuhn et al. |
| 2013/0003547 | A1 | 1/2013 | Motwani et al. |
| 2013/0028116 | A1 | 1/2013 | Kostic et al. |
| 2013/0054675 | A1 | 2/2013 | Jenkins et al. |
| 2013/0083773 | A1 | 4/2013 | Watfa et al. |
| 2013/0089096 | A1 | 4/2013 | Song |
| 2013/0119770 | A1 | 5/2013 | Guo |
| 2013/0142499 | A1 | 6/2013 | Major et al. |
| 2013/0170451 | A1 | 7/2013 | Krause et al. |
| 2014/0025837 | A1 | 1/2014 | Swenson et al. |
| 2014/0050083 | A1 | 2/2014 | Layman et al. |
| 2014/0067859 | A1 | 3/2014 | White |
| 2014/0181266 | A1 | 6/2014 | Joch et al. |
| 2014/0282526 | A1 | 9/2014 | Basavaiah et al. |
| 2014/0343989 | A1 | 11/2014 | Martini |
| 2015/0043528 | A1 | 2/2015 | Salkintzis |
| 2015/0381755 | A1 | 12/2015 | Li et al. |
| 2016/0140001 | A1 | 5/2016 | Kulkarni et al. |

FOREIGN PATENT DOCUMENTS

| | | | |
|---|---|---|---|
| EP | 2 037 634 | A1 | 3/2009 |
| EP | 2 037 641 | A1 | 3/2009 |
| WO | 2007/040346 | A1 | 4/2007 |
| WO | 2011/078646 | A1 | 6/2011 |
| WO | 2012/072407 | A1 | 6/2012 |
| WO | 2013/003634 | A1 | 1/2013 |
| WO | 2013/025168 | A1 | 2/2013 |

OTHER PUBLICATIONS

Managed Internet Service, AT&T, accessed on Oct. 14, 2013, available at https://www.business.att.com/enterprise/Service/network-services/internet-connectivity/managed-internet-services/#fbid=UOFn1XqPzra (5 pages).

Trost, Katherine, Choosing WAN Connectivity and Services Wisely, TechTarget (2009) available at: http://searchenterprisewan.techtarget.com/Choosing-WAN-connectivity-and-services-wisely (29 pages).

U.S. Appl. No. 14/610,604 (2016/0226790), filed Jan. 30, 2015 (Aug. 4, 2016, Yiu Leung Lee (Comcast Cable Communications, LLC).

* cited by examiner

PROVISIONING AND MANAGING RESOURCES

CROSS REFERENCE TO RELATED PATENT APPLICATION

This application claims priority under 35 U.S.C. § 120 to, and is a continuation of, U.S. patent application Ser. No. 14/610,604, filed Jan. 30, 2015, the entire contents of which are hereby incorporated herein by reference in its entirety for all purposes.

BACKGROUND

A network, such as a local area network, can use one or more of the network devices (e.g., access points (APs), shared resources, etc.) to permit one or more user devices to communicate with and/or over the network. A network device can also be configured to provide access to one or more services (e.g., private network, public network, network-related services). However, when multiple user devices connect to the same network, the resources of the network must be allocated. Often, allocation of a particular resource to a particular user device has a detrimental effect on other devices seeking service from that particular resource. These and other shortcomings are addressed by the present disclosure.

SUMMARY

It is to be understood that both the following general description and the following detailed description are exemplary and explanatory only and are not restrictive. Methods and systems are described for providing services (e.g., network connectivity, broadband services, etc.) to one or more user devices or clients. Methods and systems are described for, in one aspect, providing access to one or more services by one or more user devices or clients.

Methods and systems are described for enabling a resource to determine whether it should provide a service to a device requesting service or refer the device to another resource for the service. A resource can be a network device, a set-top box, a television tuner, a processing resource, a memory, or any other resource or combination of resources. Examples of services include, but are not limited to, Internet access, a tuned channel, storage, and the like. The resource can be configured to provide the service to the device only if certain conditions are met. In an aspect, the conditions can relate to the ability of the resource (and other resources) to adequately service all devices that are connected to it. In the event the conditions are not met, the resource can disconnect a device and/or refer a device to another resource. The conditions can be based on characteristics, such as properties of the resource, the service, and/or the devices. In an aspect, the conditions can be configured to be met in a certain order. For example, a first condition can be established to determine whether a device can connect to a resource and a second condition can be configured to determine whether the resource should provide the service to the device.

By way of further example, a first condition can be whether a maximum number of devices currently using the resource is not exceeded, a maximum attribute associated with the resource (such as bandwidth) is not exceeded at the resource, a maximum attribute associated with the resource is not expected to be exceeded by the device, or the like. In an aspect, a minimum suggested attribute can be associated with the service or the device. For example, the service can suggest a minimum bandwidth or the device can require a minimum bandwidth. Determining whether the resource can accommodate the minimum suggested attribute can be the second condition. The resource can refuse to provide the service to the device if the second condition is not met and provide the service if the second condition is met. In an aspect, the resource can disconnect the device and/or refer the device to another resource that can provide the service.

In an aspect, methods can comprise determining whether a first condition is met based upon a first characteristic relating to one or more of a user device and a first network device. The first condition can be whether adding the user device will cause the first network device to exceed a maximum threshold and the first characteristic can be the number of devices currently associated with the first network device. Association (e.g., access, data transmission, communication, etc.) between the user device and the first network device can be denied if the first condition is not met. Association between the user device and the first network device can be granted if the first condition is met. Service can be provided to the user device via the first network device if the first network device is configured to meet a second condition. In an aspect, the service can be, for example, Internet access, or more specifically, Internet access for accessing a video streaming website and the second condition can be a suggested bandwidth. The second condition can be based upon a second characteristic relating to one or more of the user device (or other user devices), the service, and the first network device. For example, the second characteristic can be the bandwidth currently used by other user devices currently attached to the first network device. The user device can be caused to associate with a second network device if the first network device is not configured to meet the second condition. The resolution of the conditions before service is provided helps resources discontinue association with devices when it is apparent that it is inappropriate for the resource to continue doing so.

In another aspect, methods can comprise determining a first characteristic based on an availability of a first resource. The first characteristic can be the number of devices currently receiving service from the first resource. The first resource can be a network device, such as a network access point, for example. An incoming message can be received from a second resource that provides information about the second resource to the first resource. The incoming message can relate to a second characteristic. The second characteristic can be, for example, a number of devices currently receiving service from the second resource. An outgoing message can be transmitted to the second resource that provides information about the first resource to the second resource. The outgoing message can relate to the first characteristic. A request for service can be received at the first resource (or the second resource) from a user device. One or more of the first resource and the second resource can be selected to provide the requested service based on one or more of the first characteristic, the second characteristic, and the request for service. The message exchange between the resources enables the resources to determine which resource should respond to a request for service.

In a further aspect, methods can comprise transmitting a request to associate a user device with (e.g., access, transmit data with, communicate with, etc.) a network. A response can be received allowing association of the user device with the network in the event a first condition is met and a response denying association can be received in the event the first condition is not met. The first condition can be, for example, whether adding the user device will cause the network to exceed a maximum threshold. The first condition can be based on a first characteristic relating to one or more of the user device and the network. For example, the first characteristic can be a number of other devices currently associated with the network. Service can be received from a first network device on the network, such as a Wi-Fi access point, if the first network device is configured to meet a second condition. The second condition can be whether adding the user device will cause the first network device to exceed a maximum threshold, for example. The second condition can be based upon a second characteristic relating to one or more of the user device and the first network device. The second characteristic can be a number of other devices currently associated with the first network device, for example. If the first network device is not configured to meet the second condition, a request can be transmitted to a second network device for the user device to associate with the network. The resolution of the conditions ensures that the user device is connected to the network if the network has sufficient capacity and that the connection is established through an appropriate network device.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
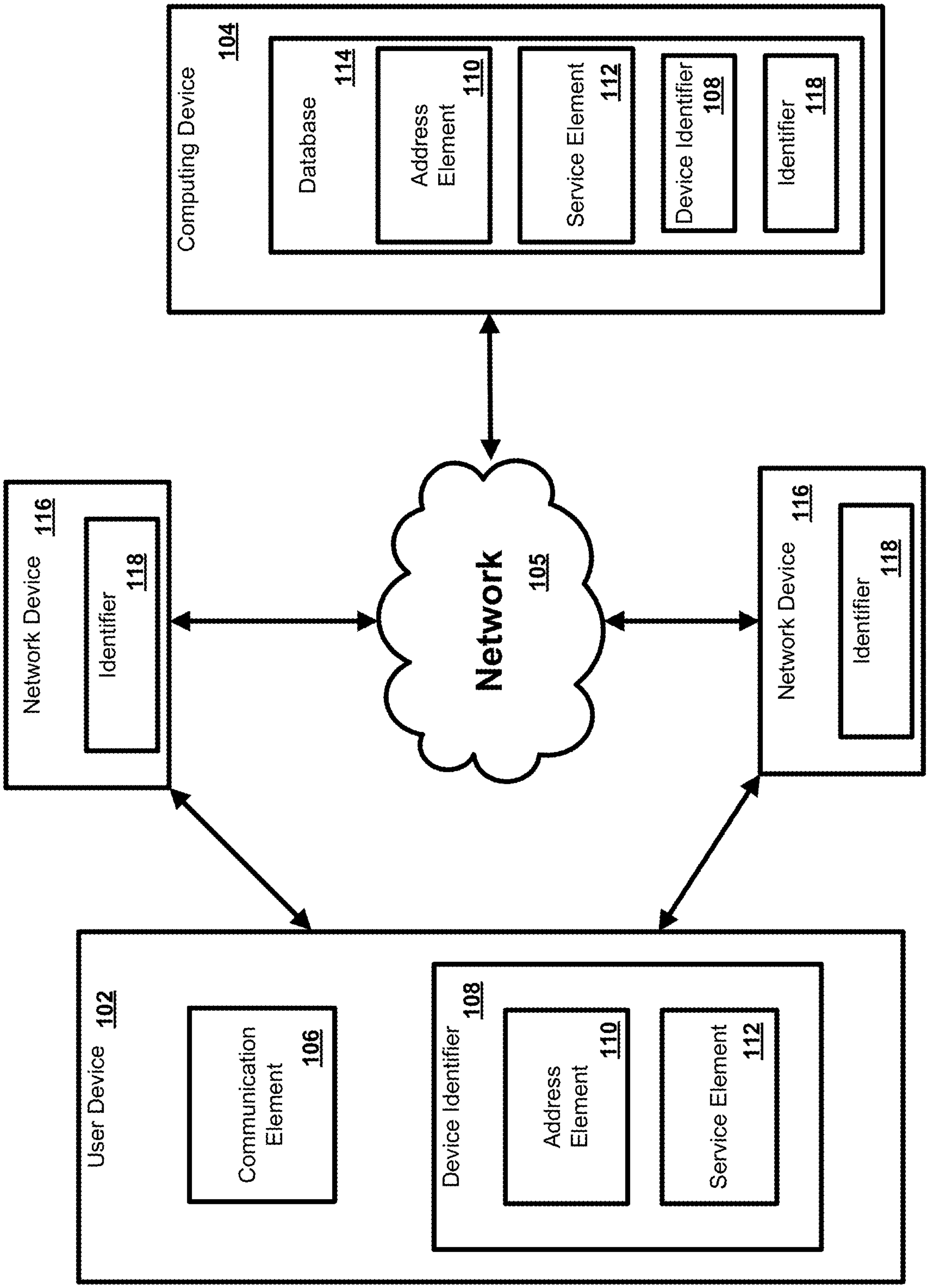
FIG. 1 is a block diagram of an exemplary system and network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded on a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Methods and systems are described for, in one aspect, providing services (e.g., network connectivity, broadband services, etc.) to one or more user devices or clients. A plurality of resources (e.g., computing devices, network devices, shared resources, etc.) can be configured to intelligently associate with one or more user devices based upon characteristics of the resources and/or the one or more user devices. As an example, a user device may detect a stronger communication signal with a first network device (first resource), but a second network device (second resource) may have the capability to provide service at a higher quality. Methods and systems are described for allowing the user device to share information with the network, whereby the resources of the network can be allocated based on such information. As a further example, if the user device is seeking a unique service offered by the second network device, the user device can associate with the second network device even though the communication signal may be weaker than the communication signal detected with the first network device. Various characteristics can be shared among the resources and/or the one or more user devices to facilitate customized allocation of the resources.

In one aspect of the disclosure, a system can be configured to provide services such as network-related services. FIG. 1 illustrates various aspects of an exemplary environment in which the present methods and systems can operate. The present disclosure is relevant to systems and methods for providing services to a user device, for example. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a user device 102 in communication with a computing device 104 such as a server, for example. The computing device 104 can be disposed locally or remotely relative to the user device 102. As an example, the user device 102 and the computing device 104 can be in communication via a private and/or public network 105 such as the Internet. Other forms of communications can be used such as wired and wireless telecommunication channels, for example.

In an aspect, the user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting information to the user and receiving a user feedback such as an application client or a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

In an aspect, the user device 102 can be associated with a user identifier or device identifier 108. As an example, the device identifier 108 can be any identifier, token, character, string, or the like, for differentiating one user or user device (e.g., the user device 102) from another user or user device. In a further aspect, the device identifier 108 can identify a user or user device as belonging to a particular class of users or user devices. As a further example, the device identifier 108 can comprise information relating to the user device 102 such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can be an internet protocol address, a MAC address, a network address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network and/or location.

In an aspect, the service element 112 can comprise an identification of a service provider associated with the user device 102 and/or with the class of the user device 102. As an example, the service element 112 can comprise information relating to or provided by a communication service provider (e.g., Internet service provider) that is providing or enabling communication services to the user device 102. As a further example, the service element 112 can comprise information relating to a preferred service provider for one or more particular services relating to the user device 102. In an aspect, the address element 110 can be used to identify or retrieve the service element 112, or vice versa. As a further example, one or more of the address element 110 and the service element 112 can be stored remotely from the user device 102 and retrieved by one or more devices such as the user device 102 and the computing device 104. Other information can be represented by the service element 112.

In an aspect, the computing device 104 can be a server for communicating with the user device 102. As an example, the computing device 104 can communicate with the user device 102 for providing services. In an aspect, the computing device 104 can allow the user device 102 to interact with remote resources such as data, devices, and files. As an example, the computing device can be configured as central location (e.g., a headend, or processing facility), which can receive content (e.g., data, input programming) from multiple sources. The computing device 104 can combine the content from the various sources and can distribute the content to user (e.g., subscriber) locations via a distribution system.

In an aspect, the computing device 104 can manage the communication between the user device 102 and a database 114 for sending and receiving data therebetween. As an example, the database 114 can store a plurality of data sets (e.g., mapped identifiers, relational tables, user device identifiers) (e.g., the identifier 108) or records, network device identifiers (e.g., the identifier 118), or other information. As a further example, the user device 102 can request and/or retrieve a file from the database 114. In an aspect, the database 114 can store information relating to the user device 102 such as the address element 110 and/or the service element 112. As an example, the computing device 104 can obtain the device identifier 108 from the user device 102 and retrieve information from the database 114 such as the address element 110 and/or the service elements 112. As another example, the computing device 104 can obtain the address element 110 from the user device 102 and can retrieve the service element 112 from the database 114, or vice versa. As a further example, the computing device 104 can obtain a MAC address from the user device 102 and can retrieve a local IP address from the database 114. As such, the local IP address can be provisioned to the user device 102, for example, as the address element 110 to facilitate interaction between the user device 102 and a network (e.g., LAN). Any information can be stored in and retrieved from the database 114. The database 114 can be disposed remotely from the computing device 104 and accessed via direct or indirect connection. The database 114 can be integrated with the computing system 104 or some other device or system.

In an aspect, one or more of the network devices 116 (resources) can be in communication with a network such as the network 105. As an example, one or more of the network devices 116 can facilitate the connection of a device, such as the user device 102, to the network 105. As a further example, one or more of the network devices 116 can be configured as a network gateway. In an aspect, one or more of the network devices 116 can be configured to allow one or more wireless devices to connect to a wired and/or wireless network using Wi-Fi, Bluetooth, or a similar standard.

In an aspect, the network devices 116 can be configured as a mesh network. As an example, one or more of the network devices 116 can comprise a dual band wireless network device. As an example, the network devices 116 can be configured with a first service set identifier (SSID) (e.g., associated with a user network or private network) to function as a local network for a particular user or users. As a further example, the network devices 116 can be configured with a second service set identifier (SSID) (e.g., associated with a public/community network or a hidden network) to function as a secondary network or redundant network for connected communication devices.

In an aspect, one or more of the network devices 116 can comprise an identifier 118. As an example, one or more identifiers can be a media access control address (MAC address). As a further example, one or more identifiers 118 can be a unique identifier for facilitating communications on the physical network segment. In an aspect, each of the network devices 116 can comprise a distinct identifier 118. As an example, the identifiers 118 can be associated with physical locations of the network devices 116.

In an aspect, the user device 102 can provide information such as identification information (e.g., the device identifier 108, credentials, etc.) to one or more of the network devices 116. As an example, the user device 102 can request a service such a network service by providing information to the network device 116. In another aspect, the network device 116 can transmit the information received from the user device 102 to the computing device 104. As an example, the network device 116 can invoke a lookup algorithm to locate a record associated with the information provided by the user device 102. As a further example, the record can be located in a service provider database (e.g., the database 114). In a further aspect, the information provided by the user device 102 may be associated with an identifier of the network device 116. As an example, a database record can comprise a mapping of a device identifier (e.g., the device identifier 108) and an identifier (e.g., the identifier 118) associated with the network device 116 or a service. Such database records can be shared among one or more of the network devices 116 so that the one or more of the network devices are aware of the associations between devices on the network. The computing device 104 can collect real-time information from the network devices 116, such as a number of connected clients, an available bandwidth, available radio time slots, and radio band information. The computing device 104 can store information collected from the network devices 116 in the database 114. The computing device 104 can statically or dynamically set a threshold indicating if a network device 116 can accept or reject a new user device 102. The computing device 104 can also advertise information in the database 114 to the network devices 116. The network devices 116 can autonomously make a decision to accept or reject a new user device 102. Sharing network topology and resource information among the network devices 116 can better utilize network resources rather than overloading a particularly network device 116 based solely on distance and signal strength between the user devices 102 and the particular network device 106.

In an aspect, when the user device 102 connects to a first network such as a LAN associated with a first SSID, a first network device (e.g., the network device 116, gateway device, the computing device 104, server, router, etc.) can generate or receive a mapping object such as a mapping pair (e.g., <mac address, mac address>) associated with the user device 102. As an example, a MAC address associated with the user device 102 can be mapped to a MAC address that is associated with the first network device.

In another aspect, the user device 102 can request a service (e.g., video streaming). The request can comprise information relating to one or more characteristics of the user device such as a bitrate, a minimum bandwidth, and an optimal signal-to-noise level. One or more of the network devices 116 (resources) can receive the request and can determine whether a first condition is met based upon a first characteristic relating to one or more of the user device 102 and a first network device. Association between the user device 102 and a first network device can be denied if the first condition is not met. Association between the user device 102 and the first network device can be granted if the first condition is met. Service can be provided to the user device 102 via the first network device if the first network device is configured to meet a second condition. The second condition can be based upon a second characteristic relating to one or more of the service, the user device 102 and the first network device. However, the user device 102 can be caused to associate with a second network device, if the first network device is not configured to meet the second condition.

Figure 2:
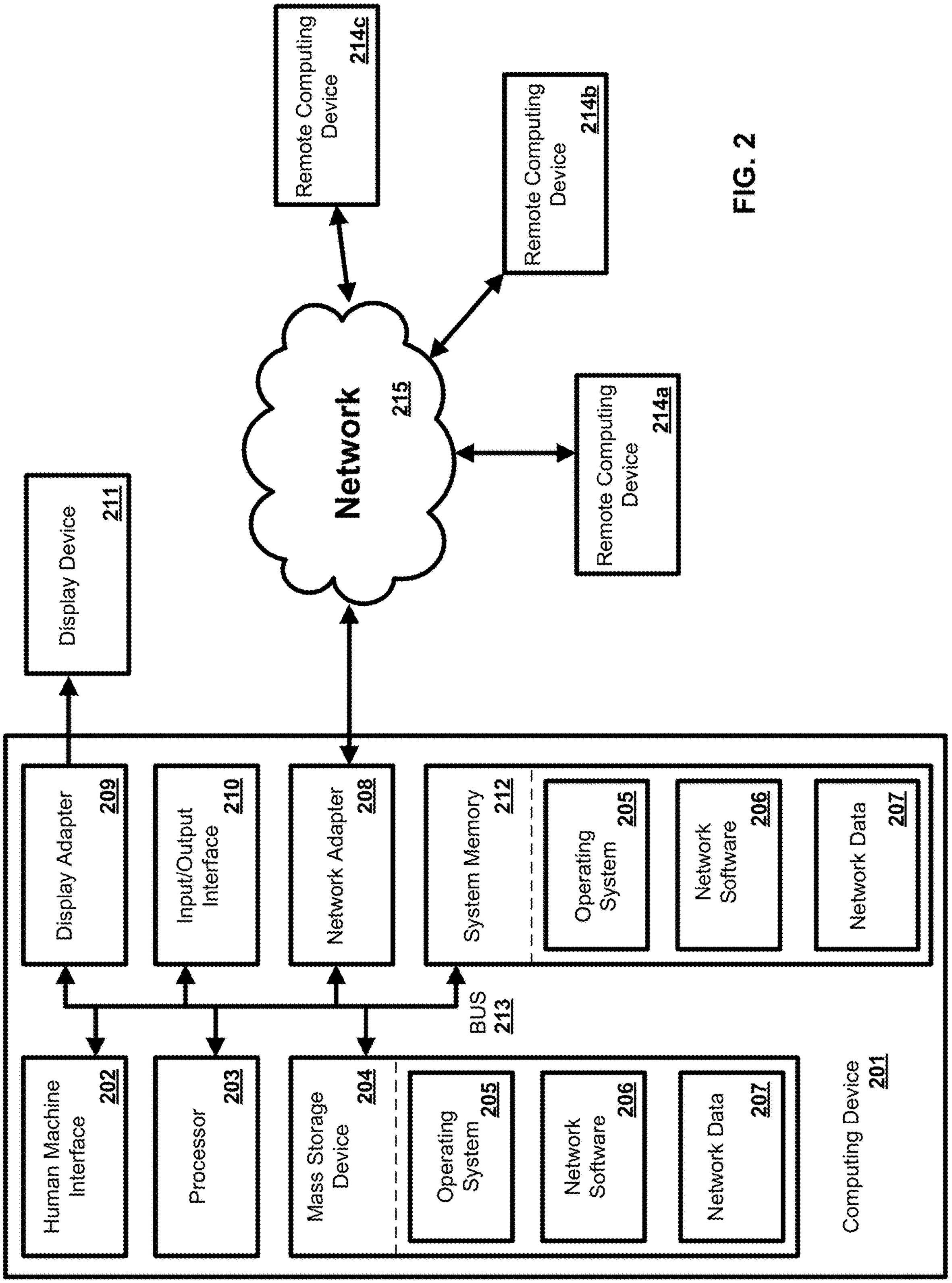
FIG. 2 is a block diagram of an exemplary computing device.

In an exemplary aspect, the methods and systems can be implemented on a computing system such as a computing device 201 as illustrated in FIG. 2 and described below. By way of example, one or more of the user device 102 and the computing device 104 of FIG. 1 can be a computer as illustrated in FIG. 2. Similarly, methods and systems are described for utilizing one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, network software 206, network data 207, a network adapter 208, system memory 212, an Input/Output Interface 210, a display adapter 209, a display device 211, and a human machine interface 202, can be contained within one or more remote computing devices 214*a,b,c* at physically separate locations, connected through buses of this form, in effect implementing a fully distributed system.

The computing device 201 typically comprises a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as the network data 207 and/or program modules such as the operating system 205 and the network software 206 that are immediately accessible to and/or are presently operated on by the processing unit 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and the network software 206. Each of the operating system 205 and the network software 206 (or some combination thereof) can comprise elements of the programming and the network software 206. The network data 207 can also be stored on the mass storage device 204. The network data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computing device 201 via the Input/Output Interface 210. Any step and/or result of the methods can be output in any form to an output device. Such output can be any form of visual representation, including, but not limited to, textual, graphical, animation, audio, tactile, and the like. The display 211 and the computing device 201 can be part of one device, or separate devices.

The computing device 201 can operate in a networked environment using logical connections to one or more remote computing devices 214*a,b,c*. By way of example, a remote computing device can be a personal computer, portable computer, a smart phone, a server, a router, a network computer, a peer device or other common network node, and so on. Logical connections between the computing device 201 and a remote computing device 214*a,b,c* can be made via a network 215, such as a local area network (LAN) and a general wide area network (WAN). Such network connections can be through a network adapter 208. The network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of the network software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

Figure 3A:
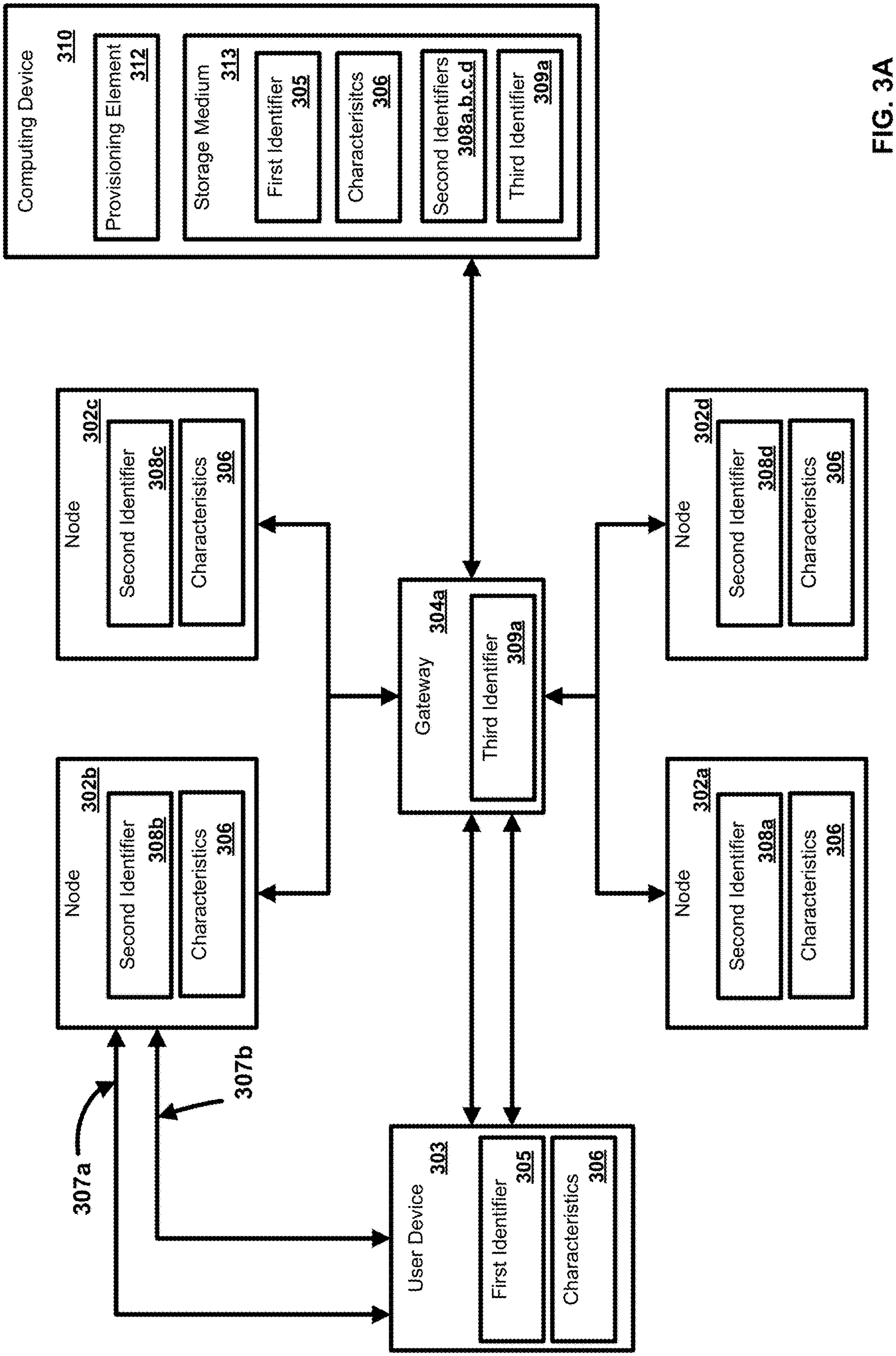
FIG. 3A is a diagram of an exemplary system and network.

FIG. 3A illustrates an exemplary system. In an aspect, a plurality of nodes 302*a*, 302*b*, 302*c*, 302*d* can be in communication with one or more user devices 303 and a gateway 304*a*. As an example, one or more nodes 302*a*, 302*b*, 302*c*, 302*d* can be a network device, router, switch, communication device, or the like. In an aspect, a node can be a resource. As another example, one or more user devices 303 can be an electronic device such as a computer, a smartphone, a laptop, a tablet, a set top box, a display device, or other device capable of communicating with one or more of the nodes 302*a*, 302*b*, 302*c*, 302*d* of the network.

In an aspect, the user device 303 can be associated with a first identifier 305 such as a user identifier or device identifier. As an example, the first identifier 305 can be any identifier, token, character, string, or the like, for differentiating one user or user device (e.g., the user device 303) from another user or user device. In a further aspect, the first identifier 305 can identify a user or user device as belonging to a particular class of users or user devices. As a further example, the first identifier 305 can comprise information relating to the user device such as a manufacturer, a model or type of device, a service provider associated with the user device 303, a state of the user device 303, a locator, and/or a label or classifier. Other information can be represented by the first identifier 305. In an aspect, the first identifier 305 can be an internet protocol address, a MAC address, a network address, an Internet address, or the like. As an example, the first identifier 305 can be relied upon to establish a communication session between the user device 303 and the computing device 310 or other devices (e.g., the nodes 302*a*, 302*b*, 302*c*, 302*d*) and/or networks. As a further example, the first identifier 305 can be used as an identifier or locator of the user device 303. In an aspect, the first identifier 305 can be persistent for a particular network and/or location.

In an aspect, one or more of the nodes 302*a*, 302*b*, 302*c*, 302*d* can be configured to communicate with another of the nodes 302*a*, 302*b*, 302*c*, 302*d* and/or the gateway 304*a* via one or more communication paths. In an aspect, the one or more communication paths can comprise one or more uninterrupted communication links, sequential links, pre-defined paths or links, and/or intervening nodes. Links can comprise a single point to point connection between two devices or network devices. Paths can comprise one or more links. As an example, one or more of the communication paths can comprise one or more of the nodes 302*a*, 302*b*, 302*c*, 302*d*. As a further example, one or more of the nodes 302*a*, 302*b*, 302*c*, 302*d* can be configured as a mesh network. In an aspect, one or more of the communication paths can be configured to transmit or provide one or more services.

In an aspect, the nodes 302*a*, 302*b*, 302*c*, 302*d* can be configured as a network such as a mesh network. As an example, the gateway 304*a* and/or one or more nodes 302*a*, 302*b*, 302*c*, 302*d* can comprise a dual band wireless network device. As an example, a first service 307*a* or network can be provided. The first service 307*a* can be configured with a first service set identifier (SSID) (e.g., associated with a user network or private network) to function as a local network for a particular user or users. As a further example, a second service 307*b* or network can be provided. The second service 307*b* can be configured with a second service set identifier (SSID) (e.g., associated with a public/community network or a hidden network) to function as a secondary network or redundant network for connected communication devices.

In an aspect, one or more of the nodes 302*a*, 302*b*, 302*c*, 302*d* can comprise a second identifier 308*a*, 308*b*, 308*c*,

308*d*. As an example, one or more identifiers can be a media access control address (MAC address). Any uniquely identifiable attribute that can be linked to a location can be used as the second identifier 308*a*, 308*b*, 308*c*, 308*d*. Such attributes can comprise one or more of an IP Address, serial number, latitude/longitude, geo-encoding, custom assigned unique identifier, global unique identifier (GUID), and the like. As a further example, one or more second identifiers 308*a*, 308*b*, 308*c*, 308*d* can be a unique identifier for facilitating communications on the physical network segment. In an aspect, each of the nodes 302*a*, 302*b*, 302*c*, 302*d* can comprise a distinct second identifier 308*a*, 308*b*, 308*c*, 308*d*. As an example, the second identifiers 308*a*, 308*b*, 308*c*, 308*d* can be associated with a physical location of the nodes 302*a*, 302*b*, 302*c*, 302*d*.

In an aspect, one or more nodes 302*a*, 302*b*, 302*c*, 302*d* can be in communication with the gateway 304*a*. As an example, one or more nodes 302*a*, 302*b*, 302*c*, 302*d* and/or the gateway 304*a* can be configured to allow one or more wireless devices to connect to a wired and/or wireless network using Wi-Fi, Bluetooth, or any wireless standard. The gateway 304*a* can comprise a third identifier 309*a*. As an example, one or more third identifiers 309*a* can be a media access control address (MAC address). As a further example, one or more third identifiers 309*a* can be a unique identifier for facilitating communications on the physical network segment.

In an aspect, a computing device 310 can be in communication with a network device such as the gateway 304*a*. As an example, the computing device 310 can be or comprise an application server, management device, auto-configuration server (ACS), AAA server, etc. In another aspect, the computing device 310 is located within a network such as a wide area network (WAN).

In an aspect, the computing device 310 can manage the communication between the gateway 304*a*, a provisioning element 312, and a storage medium 313 for sending and receiving data therebetween. In an aspect, the provisioning element 312 can be in communication with one or more of the network devices (e.g., the gateway 304*a*, and/or the nodes 302*a*, 302*b*, 302*c*, 302*d*) for provisioning one or more of the network devices and/or devices in communication with the networking devices. As an example, the provisioning element 312 can be configured to assign addressable identifiers to one or more of the user device 303, the gateway 304*a*, and/or the nodes 302*a*, 302*b*, 302*c*, 302*d*. In an aspect, one or more of the network devices can transmit information to the provisioning element 312. As an example, the transmitted information can comprise information relating to one or more of the user device 303, the gateway 304*a*, and/or the nodes 302*a*, 302*b*, 302*c*, 302*d*. As a further example, the transmitted information can comprise an identifier associated with a device seeking communication with one or more of the networks. In an aspect, the transmitted information can comprise one or more of a MAC Address, a serviceable Address, connectivity, IP Address, Geo-Location, Local DNS Resolver, and the like. In another aspect, the information can be transmitted via a dynamic host configuration protocol (DHCP) request or via remote authentication dial-in user service (RADIUS), for example.

In another aspect, the storage medium 313 can store a plurality of data sets such as mapping objects, the first identifiers 305, the second identifiers 308*a*, 308*b*, 308*c*, 308*d*, and/or the third identifiers 309 or other information. As a further example, the gateway 304*a* can request and/or retrieve a file from the storage medium 313. In an aspect, the storage medium 313 can store information relating to the user device 303, the gateway 304*a*, and/or a relationship between the user device 303 and the gateway 304*a*. As an example, the computing device 310 can obtain the first identifier 305 from the gateway 304*a* and retrieve information from the storage medium 313 such as a mapping of the first identifier 305 to the third identifier 309*a* and/or the second identifier 308*a,b,c,d*. The storage medium 313 can be disposed remotely from the computing device 310 and accessed via direct or indirect connection. The storage medium 313 can be integrated with the computing device 310 or some other device or system.

In an aspect, a device such as the user device 303 can request service, such as connectivity or access to applications, to a network by providing information (e.g., credentials, identifiers, etc.) to an access point such as the node 302*b* and/or the gateway 304*a*. In another aspect, the gateway 304*a* can transmit the information received (e.g., directly or via the node 302*b*) from the user device 303 to the computing device 310. The request can comprise information relating to one or more characteristics (e.g., the characteristics 306) of the user device 303. The service requested can have preferred characteristics. The service can have required characteristics. A characteristic can be, for example, a maximum and/or a minimum bitrate, an optimal signal-to-noise level, available radio time slots, a maximum and/or a minimum upstream bandwidth, a minimum and/or a minimum downstream bandwidth, a single band availability, a simultaneous dual-band availability, a TV tuner availability, and the like.

Figure 3B:
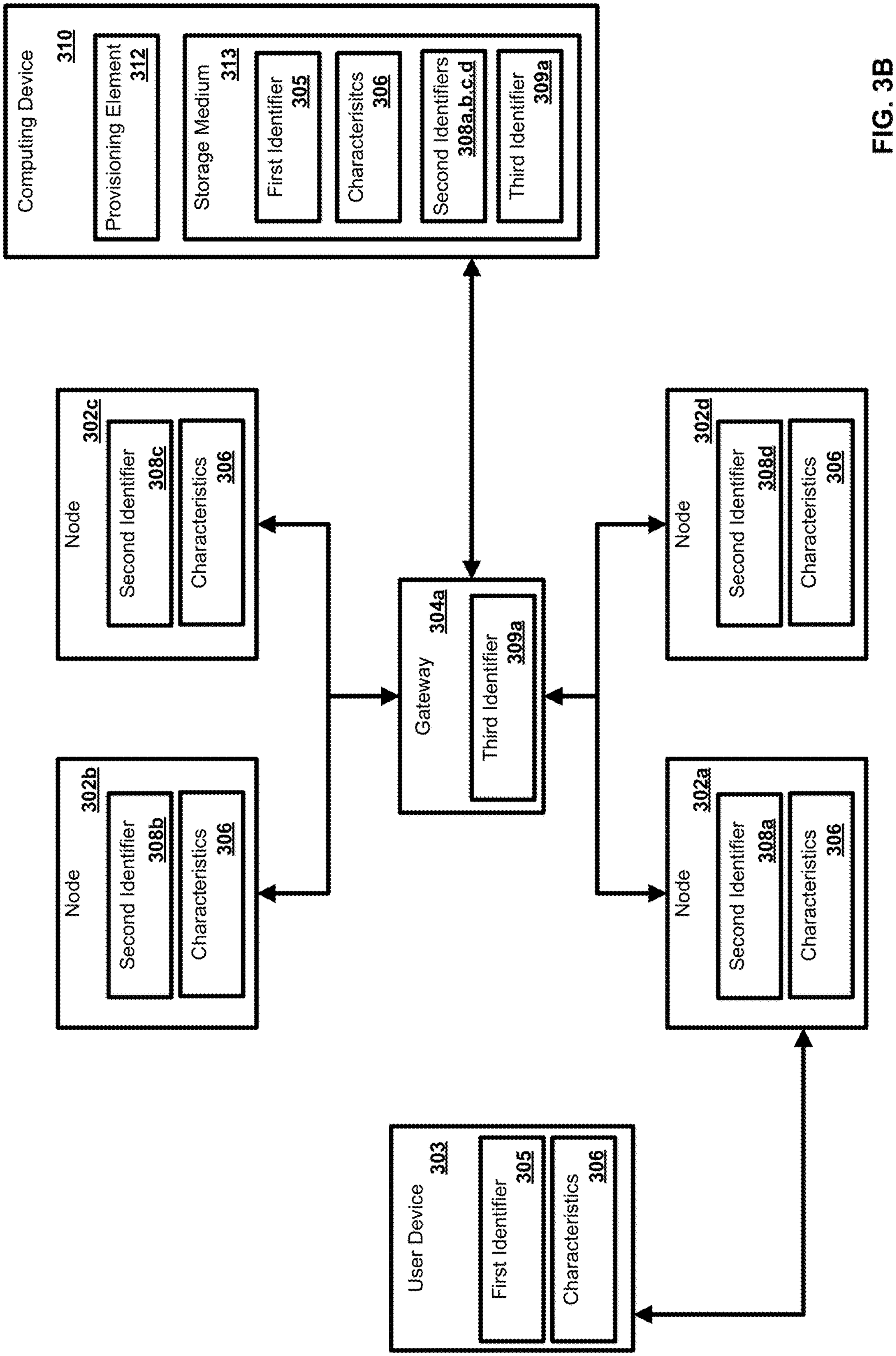
FIG. 3B is a diagram of an exemplary system and network.

One or more of the node 302*b*, the gateway 304*a*, and the computing device 310 can receive the request and can determine whether a first condition is met based upon a first characteristic of a plurality of characteristics 306 relating to one or more of the user device 303, the gateway 304*a*, the computing device 310, and one or more of the nodes 302*a*, 302*b*, 302*c*, 302*d*. Association between the user device 303 and a network (e.g., the gateway 304*a*, the computing device 310, one or more of the nodes 302*a*, 302*b*, 302*c*, 302*d*) can be denied if the first condition is not met. A condition can be one or more requirements to be satisfied before an action can occur or be performed. For example, a condition can be satisfied if a threshold is not met, met, and/or exceeded. For example, a condition may not be satisfied if a threshold is not met, met, and/or exceeded. For example, a condition can be satisfied if one or more conditional statements is matched. In an aspect, the conditional statement can be related to a characteristic of one or more of the user device 303, the gateway 304*a*, the computing device 310, and one or more nodes 302*a*, 302*b*, 302*c*, 302*d*. For instance, a conditional statement can be "the number of user devices attached to this node meets or exceeds a threshold, such as ten" or "this node has sufficient capacity to transfer data to user device 303 at a threshold rate, such as 10 Mb/s." If the conditional statement is true, then the condition is satisfied. If the conditional statement is false, then the condition is not satisfied. Association between the user device 303 and the network can be granted if the first condition is met. For example, the first condition can comprise a conditional statement, such as "the number of user devices attached to node 302*b* meets or exceeds a threshold, such as ten." In another aspect, service can be provided to the user device 303 via the node 302*b* if the node 302*b* is configured to meet a second condition. The second condition can be based upon a second characteristic of the plurality of characteristics 306 relating to one or more of the user device 303 and the node 302*b*. For example, the second condition can be "node 302*b* has sufficient capacity to transfer data to user device 303 at a threshold rate, such as 10 Mb/s." However, the user device 303 can be caused to associate with the node 302*a*, if the node 302*b* is not configured to meet the second condition but the node 302*a* is configured to meet the second condition, as illustrated in FIG. 3B. Service can then be provided to the user device 303 via the node 302*a*.

Figure 4:
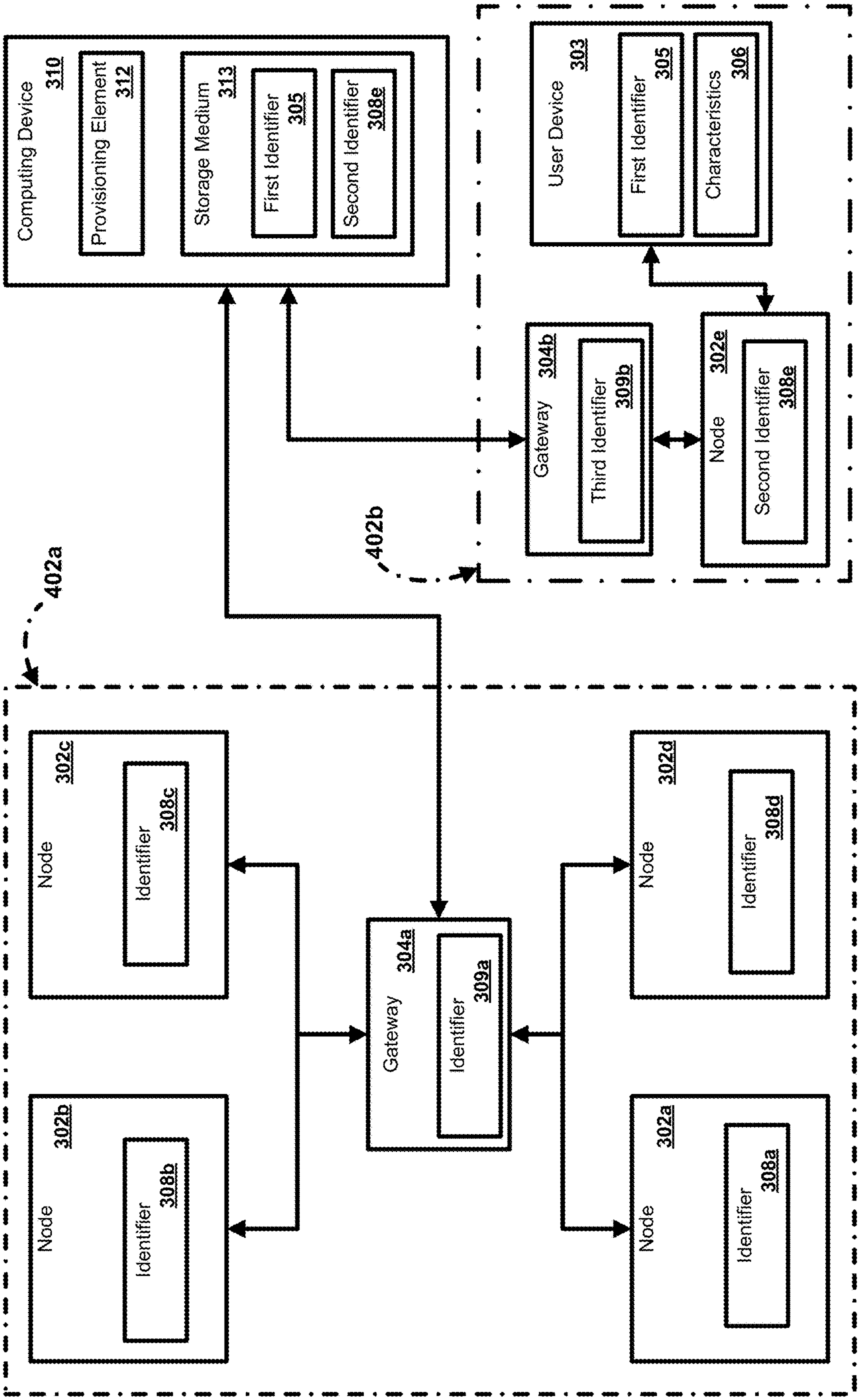
FIG. 4 is a diagram of an exemplary system and network.

As shown in FIG. 4, a first network 402*a* can comprise one or more of the nodes 302*a*, 302*b*, 302*c*, 302*d* and/or the gateway 304*a* and a second network 402*b* can comprise one or more nodes (e.g., the node 302*e*) and/or a gateway 304*b*. In an aspect, each of the first network 402*a* and the second network 402*b* can be associated with an identifier such as an SSID. As an example, the first network 402*a* can be a home network and can be associated with a private SSID, while the second network 402*b* can be an open, public network associated with a public SSID. As a further example, the user device 303 can move between the first network 402*a* and the second network 402*b*. As the user device 303 comes into range of the first network 402*a* and/or the second network 402*b*, the user device 303 can request service, such as connectivity or access to applications, by providing information (e.g., credentials, identifiers, etc.) to an access point such as the node 302*e*. The request can comprise information relating to one or more characteristics of the user device 303. The service requested can have preferred characteristics. The service can have required characteristics. A characteristic can be, for example, a maximum and/or a minimum bitrate, an optimal signal-to-noise level, available radio time slots, a maximum and/or a minimum upstream bandwidth, a minimum and/or a minimum downstream bandwidth, a single band availability, a simultaneous dual-band availability, a TV tuner availability, and the like. The node 302*e* can receive the request and can determine whether a first condition is met based upon a first characteristic of a plurality of characteristics 306 relating to one or more of the user device 303 and the node 302*e*. Association between the user device 303 and the node 302*e* can be denied if the first condition is not met. Association between the user device 303 and the node 302*e* can be granted if the first condition is met. In another aspect, service can be provided to the user device 303 via the node 302*e* if the node 302*e* is configured to meet a second condition. The second condition can be based upon a second characteristic of the plurality of characteristics 306 relating to one or more of the user device 303 and the node 302*e*. However, the user device 303 can be caused to associate with another node if the node 302*e* is not configured to meet the second condition.

Figure 5:
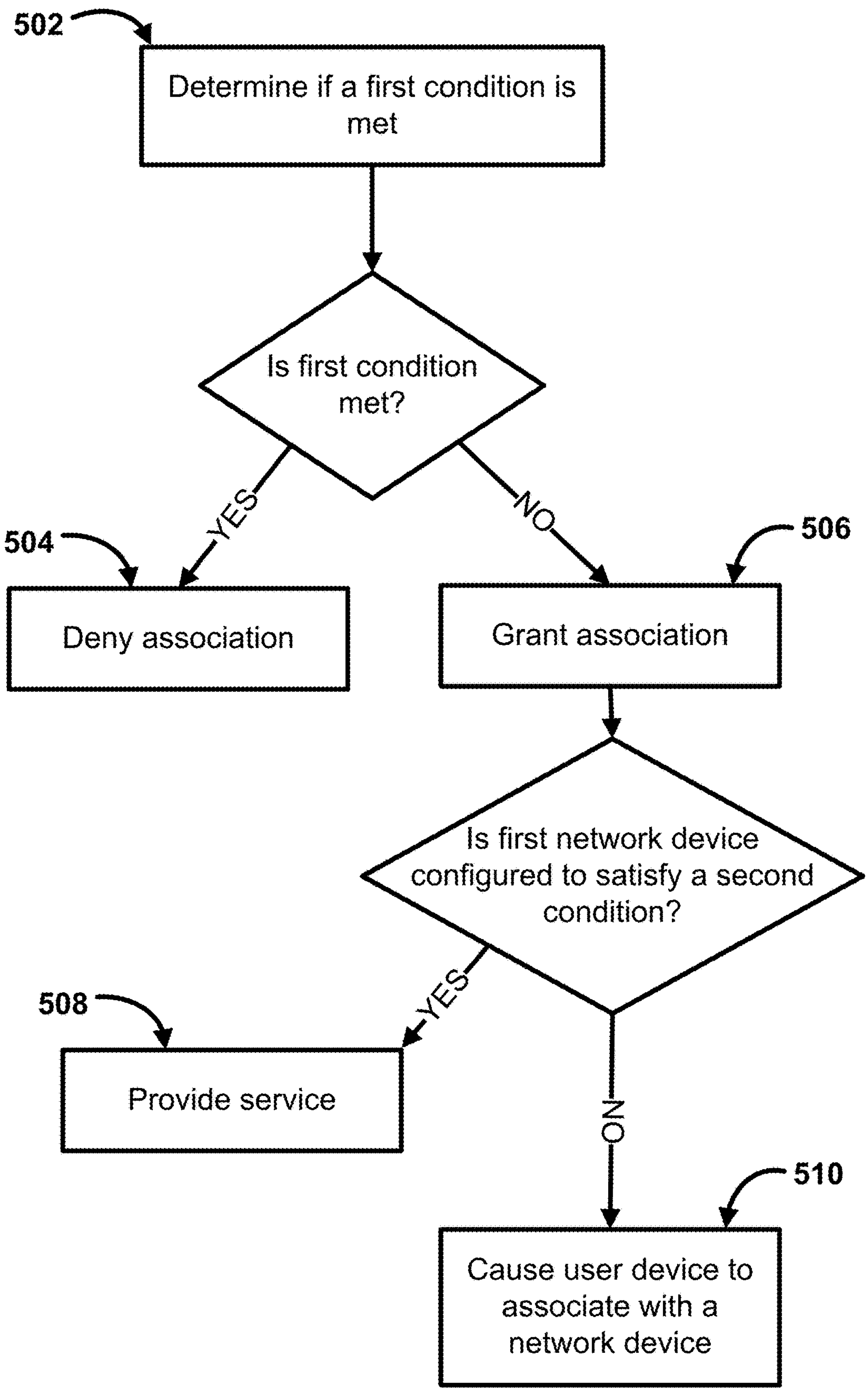
FIG. 5 is a flow chart of an exemplary method.

FIG. 5 shows an example method of causing association between a user device and a network device. In step 502, a request to associate from a user device can be received. In an aspect, a request to associate can comprise receiving/transmitting a request to connect to a wired and/or wireless network using Wi-Fi, Bluetooth, or a similar standard. In step 504, a determination can be made as to whether a first condition is met based upon a first characteristic relating to one or more of a user device and a first network device. A condition can be one or more requirements to be satisfied before an action can occur or be performed. For example, a condition can be satisfied if a threshold is not met, met, and/or exceeded. For example, a condition may not be satisfied if a threshold is not met, met, and/or exceeded. For example, a condition can be satisfied if one or more conditional statements is matched. In an aspect, the conditional statement can be related to a characteristic of one or more of the user device 303, the gateway 304*a*, the computing device 310, and one or more nodes 302*a*, 302*b*, 302*c*, 302*d*. For instance, a conditional statement can be "the number of user devices attached to this node meets or exceeds a threshold, such as ten" or "this node has sufficient capacity to transfer data to user device 303 at a threshold rate, such as 10 Mb/s." If the conditional statement is true, then the condition is satisfied. If the conditional statement is false, then the condition is not satisfied. A condition can be whether a threshold relating to a characteristic is exceeded or is not met. In an aspect, the first characteristic can relate to a number of other user devices already associated with the first network device. A characteristic can be, for example, a maximum and/or a minimum bitrate, an optimal signal-to-noise level, available radio time slots, a maximum and/or a minimum upstream bandwidth, a minimum and/or a minimum downstream bandwidth, a single band availability, a simultaneous dual-band availability, a TV tuner availability, and the like. In an aspect, the determination of whether the first condition is met or not can be made by the first network device. In another aspect, the determination of whether the first condition is met or not can be made by a network device other than the first network device. In another aspect, the determination of whether the first condition is met or not can be made by a central computing device in communication with the first network device. For example, a smart phone can request to connect to a first Wi-Fi hot spot. The first Wi-Fi hot spot can assess the available bandwidth of the first Wi-Fi hot spot in light of other devices attached to the first Wi-Fi hot spot.

In step 506, association between the user device and the first network device can be denied if the first condition is not met. As an example, when the first network device is already associated with a threshold number of user devices, additional associations can be denied. In step 508, association between the user device and the first network device can be granted if the first condition is met. In an aspect, the first network device can deny or grant the association. In another aspect, a network device other than the first network device can deny or grant the association. In another aspect, a central computing device in communication with the first network device can deny or grant the association. In the example, the first Wi-Fi hot spot can allow association with the smart phone if the first Wi-Fi hot spot determines sufficient bandwidth is available to support the smartphone or the first Wi-Fi hot spot can deny association if the first Wi-Fi hot spot determines that the available bandwidth is not sufficient to support the smartphone.

In step 510, a determination can be made as to whether the first network device is configured to meet a second condition. In an aspect, the determination of whether the first network device is configured to meet the second condition or not can be made by the first network device. In another aspect, the determination of whether the first network device is configured to meet the second condition or not can be made by a network device other than the first network device. In another aspect, the determination of whether the first network device is configured to meet the second condition or not can be made by a central computing device in communication with the first network device.

In an aspect, the second condition can be based upon a second characteristic relating to one or more of the service, the user device, and the first network device. As an example, determining whether the first network device is configured to meet the second condition can comprise determining a use type attributable to the user device, determining a third characteristic based on the determined use type, and comparing the third characteristic with the second characteristic. A use type can be, for example, a use associated with the desired service. An example of a use type can be video streaming. A third characteristic can be determined based on the determined use type by referring to a database, extracting metadata, or the like. For example, the third characteristic can be a required bitrate to support the video streaming. The comparison between the third characteristic and the second characteristic can result in a determination that the first network device is inappropriate for the determined use type (e.g., the first network device does not have the ability to support the required bitrate for the video streaming). For example, a network device can be configured with a threshold to serve a maximum bitrate of 2 Mb/s for each user request. When a user device requests to stream video from a video streaming service, the network device can check the constant bitrate of the streaming video. If the bitrate of the streaming video is within the threshold of 2 Mb/s, then the second condition is met and the network device can continue providing the service. As another example, the second characteristic can relate to a total bandwidth usage of a plurality of user devices associated with the first network device and the third characteristic can comprise a predicted bandwidth usage incurred by connected the user device. A network device can be configured to maintain the total bandwidth usage for all user devices served at or under a threshold of 90% of full capacity. If a user device requests a video streaming service, and the network device determines that serving the request would put the total bandwidth usage over the threshold, the network device can discontinue providing the service.

As a further example, determining whether the first network device is configured to meet the second condition can comprise receiving a fourth characteristic related to the second network device, and comparing the third characteristic with the fourth characteristic. As a result of the comparison, it can be determined that the second network device is appropriate to provide the service to the user device. In the example, a smart phone can request a high definition video with a suggested bandwidth of 4 megabits per second. In the example, the first Wi-Fi hot spot can assess the available bandwidth of the first Wi-Fi hot spot in light of other devices attached to the first Wi-Fi hot spot and a second Wi-Fi hot spot can assess the available bandwidth of the second Wi-Fi hot spot in light of other devices attached to the second Wi-Fi hot spot. In the example, the first Wi-Fi hot spot can exchange information related to bandwidth availability with the second Wi-Fi hot spot. The first Wi-Fi hot spot can determine whether the first Wi-Fi hot spot is capable of a bandwidth of 4 megabits per second or more, and if not, the second Wi-Fi hot spot can provide the video if the second Wi-Fi hot spot is capable of a bandwidth of 4 megabits per second or more.

In step 512, a service can be provided to the user device via the first network device if the first network device is configured to meet a second condition. Examples of services include, but are not limited to, Internet access, a tuned channel, storage, and the like. In step 514, the user device can be caused to associate with a second network device if the first network device is not configured to meet the second condition. In an aspect, causing the user device to associate with the second network device regardless of the relative signal strengths of the first and second network devices can comprise the first network device terminating the association with the user device. Furthermore, the first network device can provide instructions to the user device to enable the user device to associate with the second network device. Additionally, information such as characteristics (e.g., the first characteristic, the second characteristic, the third characteristic, etc.) can be transmitted from the first network device to the second network device for processing and decision making. In the example, if the first Wi-Fi hot spot can provide a bandwidth of 4 megabits per second, then the first Wi-Fi hot spot can provide the requested video. If the first Wi-Fi hot spot cannot provide a bandwidth of 4 megabits per second, then the first Wi-Fi hot spot can disconnect with the smart phone and refuse a connection, causing the smart phone to search for another Wi-Fi hot spot. Alternatively, if the first Wi-Fi hot spot cannot provide a bandwidth of 4 megabits per second and the second Wi-Fi hot spot can provide a bandwidth of 4 megabits per second, then the first Wi-Fi hot spot can disconnect with the smart phone, refuse connection, and simultaneously cause the second Wi-Fi hot spot to broadcast an SSID to the smart phone.

Figure 6:
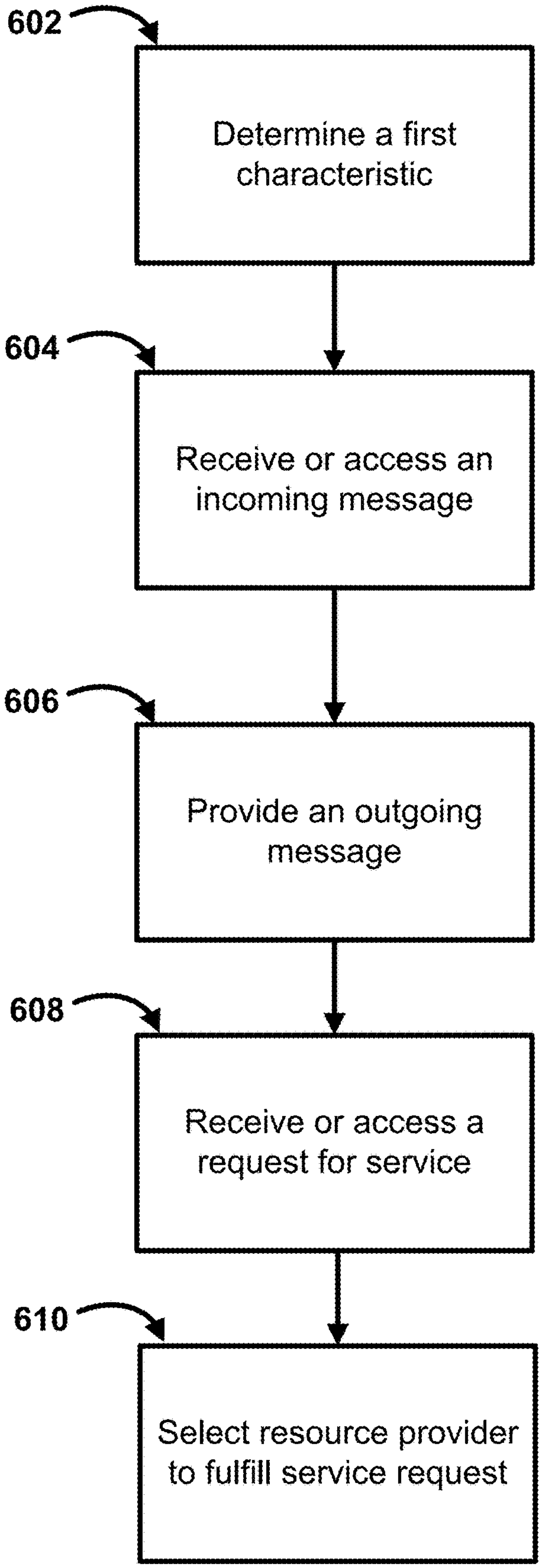
FIG. 6 is a flow chart of an exemplary method.

FIG. 6 shows an example method of selecting a resource to fulfill a service request. In step 602, a first characteristic can be determined based on an availability of a first resource. A characteristic can be, for example, a maximum and/or a minimum bitrate, an optimal signal-to-noise level, available radio time slots, a maximum and/or a minimum upstream bandwidth, a minimum and/or a minimum downstream bandwidth, a single band availability, a simultaneous dual-band availability, a TV tuner availability, and the like. A resource can be a network device, a set-top box, a television tuner, a processing resource, a memory, or any other resource or combination of resources. The availability of resources can comprise the availability of television tuners, availability of processing resources, availability of memory, availability of network capacity, combinations thereof, and the like. Availability can be determined by a bandwidth limit for the first resource, a bandwidth limit for a location (such as a household) associated with the first resource, a maximum number of allowable attached devices for the first resource, a maximum number of allowable attached devices for a location (such as a household) associated with the first resource, a maximum number of allowable devices of a particular type, such as a Wi-Fi extender, or any combination thereof. In a first example, a first Wi-Fi hot spot can determine a current bandwidth usage of devices currently connected to the first Wi-Fi hot spot. In a second example, a first set-top box can determine how many tuners of the first set-top box are currently being used.

In step 604, an incoming message can be received from a second resource. The incoming message can relate to a second characteristic. The second characteristic can be related to the second resource. The incoming message can relate to a third characteristic of a third resource. In an aspect, an incoming message can relate to characteristics of neighboring resources. In an aspect, a resource can comprise a network device. In a first example, a first Wi-Fi hot spot can receive an incoming message from a neighboring resource, such as a second Wi-Fi hot spot. The incoming message can relate to characteristics of neighboring resources, such as a current bandwidth usage of devices currently connected to the second Wi-Fi hot spot. In a second example, the first set-top box can receive an incoming message from a neighboring resource, such as a second set-top box, wherein the incoming message relates to characteristics of neighboring resources, such as how many tuners of the second set-top box are currently being used.

In step 606, an outgoing message can be provided to the second resource. The outgoing message can relate to the first characteristic. The outgoing message can relate to the third characteristic of the third resource. In an aspect, the first resource can provide information relating to characteristics of the first resource, as well as characteristics from a first portion of neighboring resources to a second portion of neighboring resources. In a first example, a network device, such as a first Wi-Fi hot spot can transmit a message relating to a characteristic, such as the current bandwidth usage of devices connected to the first Wi-Fi hot spot, to a second Wi-Fi hot spot. In a second example, a network device, such as a first set-top box can transmit a message relating to a characteristics, such as how many tuners of the first set-top box are being used, to the second set-top box.

In step 608, a request for service can be received, for example from a user device at the first resource. Examples of service that can be requested include, but are not limited to, Internet access, a tuned channel, storage, and the like. In a first example, the first Wi-Fi hot spot can receive a request for service, for example, a request to connect from a smart phone. In a second example, the first set-top box can receive a request to tune to a channel.

In step 610, one or more of the first resource and the second resource can be selected to fulfill the service request regardless of the relative signal strengths of the first and second resources based on one or more of the first characteristic, the second characteristic, and the request for service. In an aspect, based on the incoming message(s) the first resource can access information related to usage of other resources in the first resource's neighborhood, including the second resource. The first resource can utilize the information to determine whether the first resource should respond to the request. If the first resource determines that another resource (e.g., the second resource) is better suited to respond to the request, then the first resource can relay the request to the better suited resource. In a first example, either a first resource, such as a first Wi-Fi hot spot, or a second resource, such as a second Wi-Fi hot spot, can be selected based on one or more of the current bandwidth usage of devices currently connected to the first Wi-Fi hot spot, the current bandwidth usage of devices currently connected to the second Wi-Fi hot spot, and the request to connect. In a second example, either a first resource, such as a first set-top box or a second resource, such as a second set-top box can be selected based on one or more of how many tuners of the first set-top box are currently being used, how many tuners of the second set-top box are currently being used, and the request.

Figure 7:
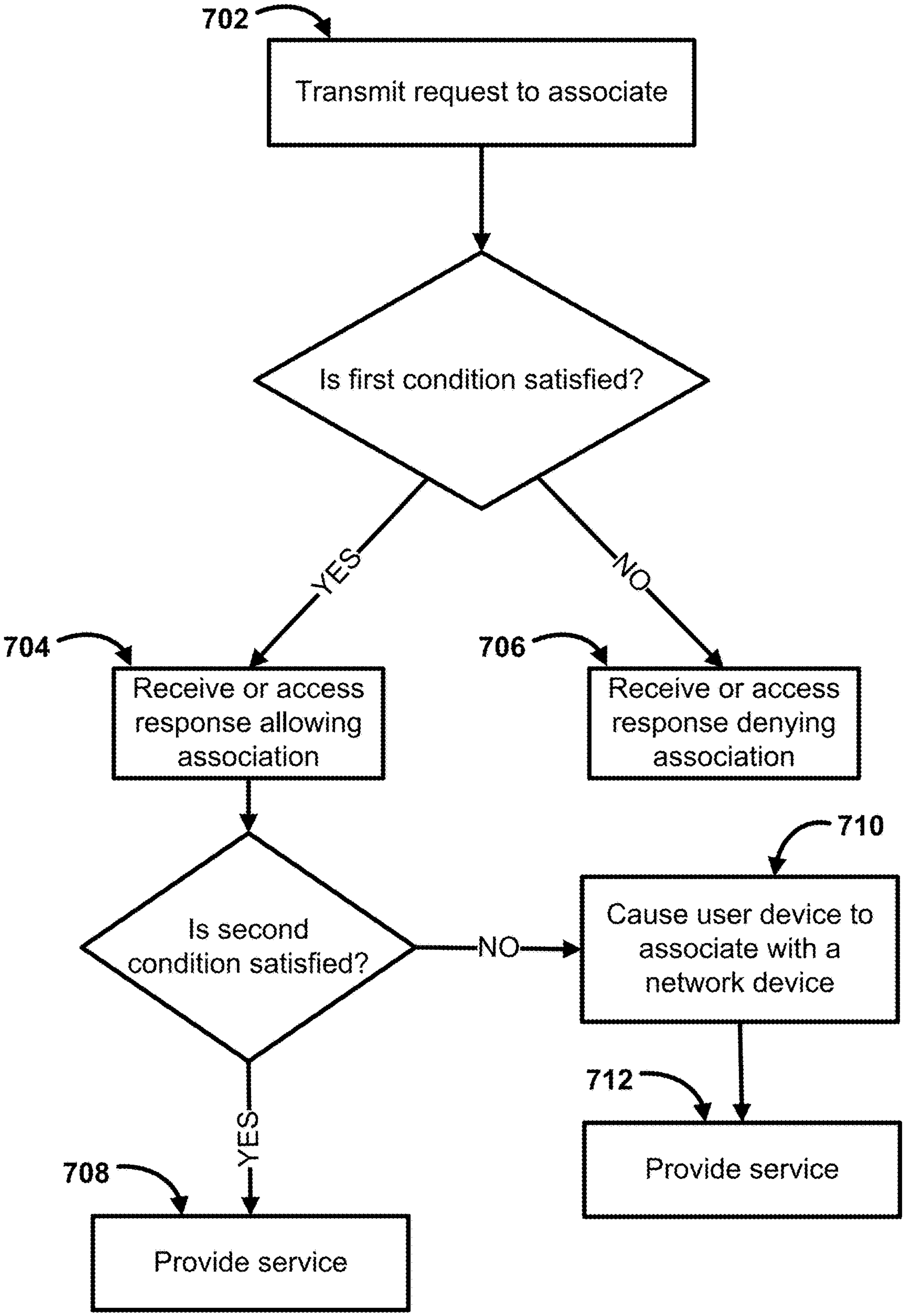
FIG. 7 is a flow chart of an exemplary method.

FIG. 7 shows an example method of receiving service from a network device. In step 702, a request to associate with a network can be transmitted, for example, by a user device. For example, a smart phone can transmit a request for access to a wireless local area network (WLAN). In step 704, a response allowing association with the network can be received in the event that a first condition is met. A condition can be one or more requirements to be satisfied before an action can occur or be performed. For example, a condition can be satisfied if a threshold is not met, met, and/or exceeded. For example, a condition may not be satisfied if a threshold is not met, met, and/or exceeded. For example, a condition can be satisfied if one or more conditional statements is matched. In an aspect, the conditional statement can be related to a characteristic of one or more of the user device 303, the gateway 304*a*, the computing device 310, and one or more nodes 302*a*, 302*b*, 302*c*, 302*d*. For instance, a conditional statement can be "the number of user devices attached to this node meets or exceeds a threshold, such as ten" or "this node has sufficient capacity to transfer data to user device 303 at a threshold rate, such as 10 Mb/s." If the conditional statement is true, then the condition is satisfied. If the conditional statement is false, then the condition is not satisfied.

In step 706, a response denying association can be received in the event that the first condition is not met. In an aspect, the first condition can be based on a first characteristic relating to one or more of the user device and the network. A condition can be whether a threshold relating to a characteristic is exceeded or is not met. In an aspect, the first characteristic can relate to a number of other user devices already associated with the first network device. A characteristic can be, for example, a maximum and/or a minimum bitrate, an optimal signal-to-noise level, available radio time slots, a maximum and/or a minimum upstream bandwidth, a minimum and/or a minimum downstream bandwidth, a single band availability, a simultaneous dual-band availability, a TV tuner availability, and the like.

In an example, the smart phone can receive a response from the WLAN allowing the smart phone to connect to the WLAN if a number of devices attached to the WLAN is less than a threshold number (regardless of the number of devices that may be attached to a particular node with which the user device may be communicating). Alternatively, the smart phone can receive a response from the WLAN indicating that the smart phone cannot connect to the WLAN because the number of devices attached to the WLAN is equal to or more than the threshold number. In step 708, after associating with the network, service from a first network device can be received if the first network device is configured to meet a second condition. The second condition can be based upon a second characteristic relating to one or more of the service, the user device, and the first network device. In an aspect, determining whether the first network device is configured to meet the second condition can comprise determining a use type attributable to the user device, determining a third characteristic based on the determined use type, and comparing the third characteristic with the second characteristic. A use type can be, for example, a use associated with the desired service. An example of a use type can be video streaming. A third characteristic can be determined based on the determined use type by referring to a database, extracting metadata, or the like. For example, the third characteristic can be a required bitrate to support the video streaming. The comparison between the third characteristic and the second characteristic can result in a determination that the first network device is or is not inappropriate for the determined use type (e.g., the first network device does or does not have the ability to support the required bitrate for the video streaming).

As a further example, determining whether the first network device is configured to meet the second condition can comprise receiving a fourth characteristic related to a second network device, and comparing the third characteristic with the fourth characteristic. As a result of the comparison, it can be determined that the second network device is appropriate to provide the service to the user device (e.g., the second network device has the ability to support the required bitrate for the video streaming).

Determining whether the first network device is configured to meet the second condition can also comprise communicating a plurality of characteristics among a plurality of network devices, for example as described above and illustrated in FIG. 6.

In step 710, action or inaction can cause the user device to associate with a second network device regardless of the relative signal strengths of the first and second network devices if the first network device is not configured to meet the second condition. In an aspect, the user device association with the second network device can be caused by the first network device refusing service to the user device. In an aspect, the user device association with the second network device can be caused by a request transmitted to the second network device for the user device to associate with the network through the second network device. In an aspect, a determination of whether the second network device is configured to meet the second condition can be made in a similar fashion as the determination as to whether the first network device is configured to meet the second condition. In step 712, service can be received from the second network device if the second network device is configured to meet the second condition.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. An apparatus comprising:

one or more processors; and memory storing processor-executable instructions that, when executed by the one or more processors, cause the apparatus to:

receive, from a user device, a request to receive content at a requested bitrate;

determine that the apparatus cannot satisfy the request to provide the content at the requested bitrate and a second network device can satisfy the request to provide the content at the requested bitrate;

determine, based on the apparatus not being able to satisfy the request and the second network device being able to satisfy the request, an indication that the user device is denied from connecting to the apparatus; and cause, based on the indication of the denial of the connection between the apparatus and the user device, the user device to connect to the second network device.

2. The apparatus of claim 1, wherein the processor-executable instructions that, when executed by the one or more processors, cause the apparatus to determine that the apparatus cannot satisfy the request to provide the content at the requested bitrate, cause the apparatus to determine that granting the user device the connection to the apparatus would cause the apparatus to exceed a maximum quantity of clients.

3. The apparatus of claim 1, wherein the processor-executable instructions, when executed by the one or more processors, further cause the apparatus to receive, from the second network device, an indication that the second network device can satisfy the request to provide the content at the requested bitrate.

4. One or more non-transitory computer-readable media storing processor-executable instructions that, when executed by at least one processor, cause the at least one processor to:

receive, from a user device, a request to receive content at a requested bitrate;

determine that a network device associated with the at least one processor cannot satisfy the request to provide the content at the requested bitrate and a second network device can satisfy the request to provide the content at the requested bitrate;

determine, based on the network device not being able to satisfy the request and the second network device being able to satisfy the request, an indication that the user device is denied from connecting to the network device; and cause, based on the indication of the denial of the connection between the network device and the user device, the user device to connect to the second network device.

5. The one or more non-transitory computer-readable media of claim 4, wherein the processor-executable instructions that, when executed by the at least one processor, cause the at least one processor to determine that the network device cannot satisfy the request to provide the content at the requested bitrate, cause the at least one processor to determine that granting the user device the connection to the network device would cause the network device to exceed a maximum quantity of clients.

6. The one or more non-transitory computer-readable media of claim 4, wherein the processor-executable instructions, when executed by the at least one processor, further cause the at least one processor to receive, from the second network device, an indication that the second network device can satisfy the request to provide the content at the requested bitrate.

7. A system comprising:

a first network device configured to:

receive, from a user device, a request to receive content at a requested bitrate;

determine that the first network device cannot satisfy the request to provide the content at the requested bitrate and a second network device can satisfy the request to provide the content at the requested bitrate;

determine, based on the first network device not being able to satisfy the request and the second network device being able to satisfy the request, an indication that the user device is denied from connecting to the first network device; and cause, based on the indication of the denial of the connection between the first network device and the user device, the user device to connect to the second network device; and the user device configured to:

send the request to receive the content at the requested bitrate.

8. The system of claim 7, wherein to determine that the first network device cannot satisfy the request to provide the content at the requested bitrate, the first network device is configured to determine that granting the user device the connection to the first network device would cause the first network device to exceed a maximum quantity of clients.

9. The system of claim 7, wherein the first network device is further configured to receive, from the second network device, an indication that the second network device can satisfy the request to provide the content at the requested bitrate.

10. An apparatus comprising:

one or more processors; and memory storing processor-executable instructions that, when executed by the one or more processors, cause the apparatus to:

send a request to connect to a network and receive content at a requested bitrate;

receive, from a first network device, an indication that the apparatus is denied from connecting to the first network device, wherein the apparatus is denied from connecting based on a determination that the first network device cannot satisfy the request to receive the content at the requested bitrate and a second network device can satisfy the request to provide the content at the requested bitrate; and connect to the second network device.

11. The apparatus of claim 10, wherein the content comprises at least one of streaming video, streaming music, content from an Internet, or a video game.

12. The apparatus of claim 10, wherein the processor-executable instructions, when executed by the one or more processors, further cause the apparatus to determine a signal strength between the apparatus and each of the first network device and the second network device.

13. The apparatus of claim 10, wherein the requested bitrate is set by the apparatus.

14. The apparatus of claim 10, wherein each of the first network device and the second network device comprises at least one of an access point, a gateway, a server, or a router.

15. The apparatus of claim 10, wherein the apparatus comprises at least one of a computing device, a phone, a tablet, a set top box, or a display device.

16. The apparatus of claim 10, wherein the second network device has a lower signal strength with the apparatus relative to a signal strength between the first network device and the apparatus.

17. One or more non-transitory computer-readable media storing processor-executable instructions that, when executed by at least one processor, cause the at least one processor to:

send a request to connect to a network and receive content at a requested bitrate;

receive, from a first network device, an indication that a user device associated with the at least one processor is denied from connecting to the first network device, wherein the user device is denied from connecting based on a determination that the first network device cannot satisfy the request to receive the content at the requested bitrate and a second network device can satisfy the request to provide the content at the requested bitrate; and connect to the second network device.

18. The one or more non-transitory computer-readable media of claim 17, wherein the content comprises at least one of streaming video, streaming music, content from an Internet, or a video game.

19. The one or more non-transitory computer-readable media of claim 17, wherein the processor-executable instructions, when executed by the at least one processor, further cause the at least one processor to determine a signal strength between the user device and each of the first network device and the second network device.

20. The one or more non-transitory computer-readable media of claim 17, wherein the requested bitrate is set by the user device.

21. The one or more non-transitory computer-readable media of claim 17, wherein each of the first network device and the second network device comprises at least one of an access point, a gateway, a server, or a router.

22. The one or more non-transitory computer-readable media of claim 17, wherein the user device comprises at least one of a computing device, a phone, a tablet, a set top box, or a display device.

23. The one or more non-transitory computer-readable media of claim 17, wherein the second network device has a lower signal strength with the user device relative to a signal strength between the first network device and the user device.

24. A system comprising:

a user device configured to:

send a request to connect to a network and receive content at a requested bitrate;

receive, from a first network device, an indication that the user device is denied from connecting to the first network device, wherein the user device is denied from connecting based on a determination that the first network device cannot satisfy the request to receive the content at the requested bitrate and a second network device can satisfy the request to provide the content at the requested bitrate; and connect to the second network device; and the first network device configured to:

send the indication.

25. The system of claim 24, wherein the content comprises at least one of streaming video, streaming music, content from an Internet, or a video game.

26. The system of claim 24, wherein the user device is further configured to determine a signal strength between the user device and each of the first network device and the second network device.

27. The system of claim 24, wherein the requested bitrate is set by the user device.

28. The system of claim 24, wherein each of the first network device and the second network device comprises at least one of an access point, a gateway, a server, or a router.

29. The system of claim 24, wherein the user device comprises at least one of a computing device, a phone, a tablet, a set top box, or a display device.

30. The system of claim 24, wherein the second network device has a lower signal strength with the user device relative to a signal strength between the first network device and the user device.

* * * * *